United States Patent
Schreiber et al.

(10) Patent No.: US 9,494,680 B2
(45) Date of Patent: Nov. 15, 2016

(54) RADAR BASED INTERPRETATION OF 3D CODES

(71) Applicant: Intel Corporation, Santa Clara, CA (US)

(72) Inventors: Geoff Y. Schreiber, Portland, OR (US); Joshua Boelter, Portland, OR (US); Paul J. Gwin, Orangevale, CA (US); Mark E. Sprenger, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/318,561

(22) Filed: Jun. 27, 2014

(65) Prior Publication Data

US 2015/0379314 A1 Dec. 31, 2015

(51) Int. Cl.
*G01S 13/89* (2006.01)
*G01S 7/41* (2006.01)
*G06K 19/06* (2006.01)

(52) U.S. Cl.
CPC ............ *G01S 13/89* (2013.01); *G01S 7/41* (2013.01); *G06K 2019/06225* (2013.01)

(58) Field of Classification Search
CPC ............ G06K 19/06037; G06K 19/06028; G06K 19/06093; G06K 1/126; G06K 7/10861; G06K 7/1417; G06K 7/1426

USPC .................... 235/439, 462.01, 494
See application file for complete search history.

(56) References Cited

U.S. PATENT DOCUMENTS

| 7,757,952 | B2* | 7/2010 | Tuschel | G06K 19/06037 235/375 |
| 8,308,067 | B1* | 11/2012 | Ratner | G06K 19/06159 235/462.01 |
| 8,893,978 | B2* | 11/2014 | Lau | G06K 1/20 235/494 |
| 2005/0010776 | A1* | 1/2005 | Kenen | G06Q 20/341 713/176 |
| 2014/0263674 | A1* | 9/2014 | Cerveny | G06K 19/06037 235/494 |
| 2014/0353381 | A1* | 12/2014 | Stuck | B23K 26/0036 235/462.11 |

\* cited by examiner

*Primary Examiner* — Seung Lee
(74) *Attorney, Agent, or Firm* — Jordan IP Law, LLC

(57) ABSTRACT

Systems and methods may provide for transmitting an outbound radar signal via an antenna structure and receiving a reflected radar signal via the antenna structure. Additionally, a three dimensional (3D) code may be interpreted based on the outbound radar signal and the reflected radar signal. In one example, interpreting the 3D code includes determining depth data for each of a plurality of cells in the 3D code.

21 Claims, 4 Drawing Sheets

US 9,494,680 B2

RADAR BASED INTERPRETATION OF 3D CODES

TECHNICAL FIELD

Embodiments generally relate to code interpretation. More particularly, embodiments relate to radar based interpretation of three dimensional (3D) codes.

BACKGROUND

Quick response codes (e.g., configured as a QR CODE, registered mark of Denso Corporation, Japan) may be used to convey information such as, for example, addresses, phone numbers, uniform resource locators (URLs), product data, and so forth. A typical QR CODE may contain a two dimensional (2D) array of black dots arranged in a square grid on a white background, wherein a device such as a camera may capture an image of the QR CODE and use error correction techniques to evaluate/read the image. The presence or absence of a black dot at each 2D location may encode only a single bit of data (e.g., present=one, absent=zero) into the location, which may limit the amount of information that can be encoded into the QR CODE. Moreover, the imaging and error processing capacity of the camera, as well as environmental conditions (e.g., poor lighting, airborne debris, hand tremors/vibrations, scans that are at an angle relative to the QR CODE, etc.) may place substantial constraints on the use of conventional quick response codes in many practical circumstances (e.g., typical mobile phone use).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
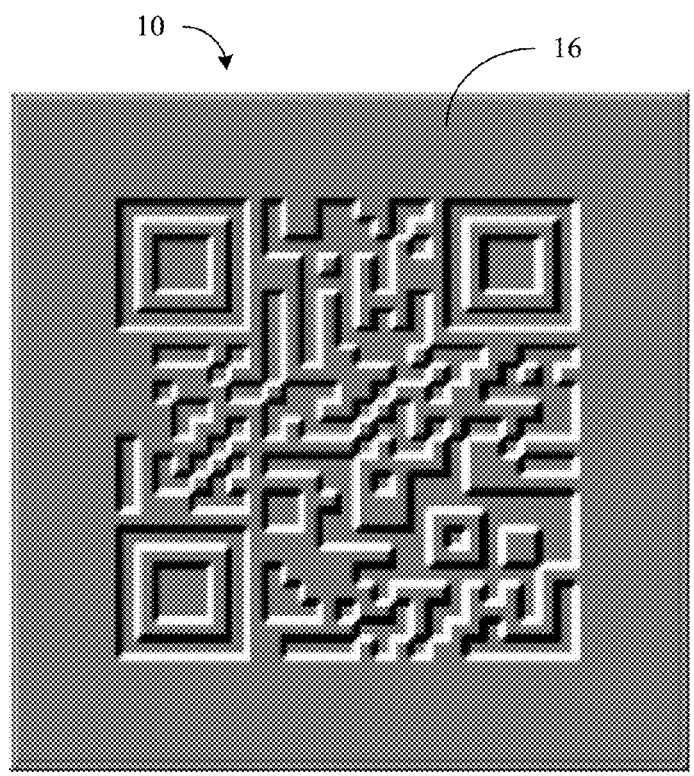
FIG. 1 is an illustration of an example of a three dimensional (3D) code according to an embodiment.
Figure 2:
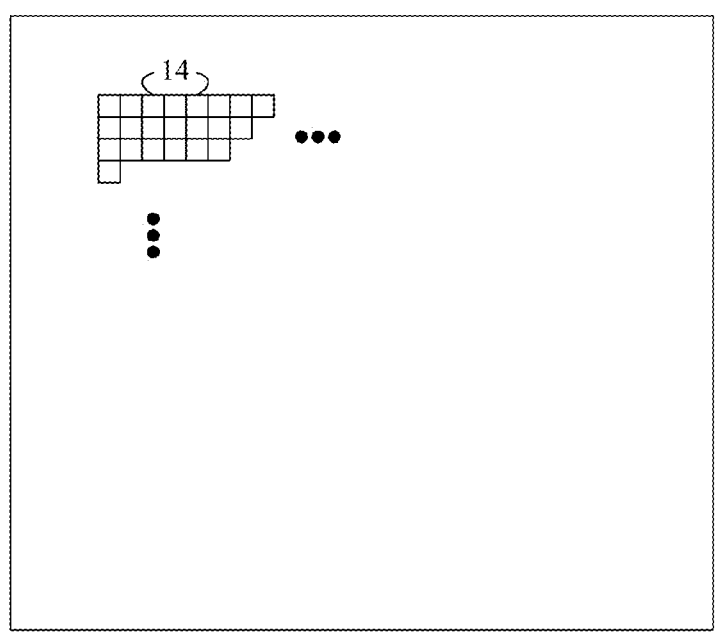
FIG. 2 is an illustration of an example of a cell layout of a 3D code according to an embodiment.

Turning now to FIGS. 1 and 2, a cell layout 12 for a three dimensional (3D) code 10 is shown in which the depth of a surface 16 containing the 3D code 10 varies across a plurality of cells 14. The 3D code 10, which may be used to store, encode and/or convey a wide variety of information (e.g., addresses, phone numbers, URLs, serial numbers, vehicle identification numbers/VINs, etc.), may be generated by, for example, stamping, etching, engraving and/or 3D printing on the surface 16 so that each cell 14 may encode more than one bit of information. As will be discussed in greater detail, radar signals may be used to read the 3D code 10. Accordingly, the surface 16 may be non-penetrable by radar signals so that the time of travel for radar signals impacting and reflecting off of the 3D code 10 enables the depth of the surface 16 to be determined at each cell 14. In one example, the 3D code includes a QR CODE having three dimensions.

Moreover, the surface 16 may be covered/coated with a different material (not shown) such as, for example, paint, epoxy, plastic, film, etc., that is penetrable by radar signals. The material covering the plurality of cells 14 may be opaque so that it visually masks the depth of the surface 16 across the plurality of cells 14 and renders the 3D code 10 effectively invisible to the human eye. The material may also be relatively durable to protect the 3D code 10 from being damaged and/or removed. Such an approach may be particularly useful as a security measure when information such as product serial numbers and/or VINs are encoded into the 3D code 10.

Figure 3A:
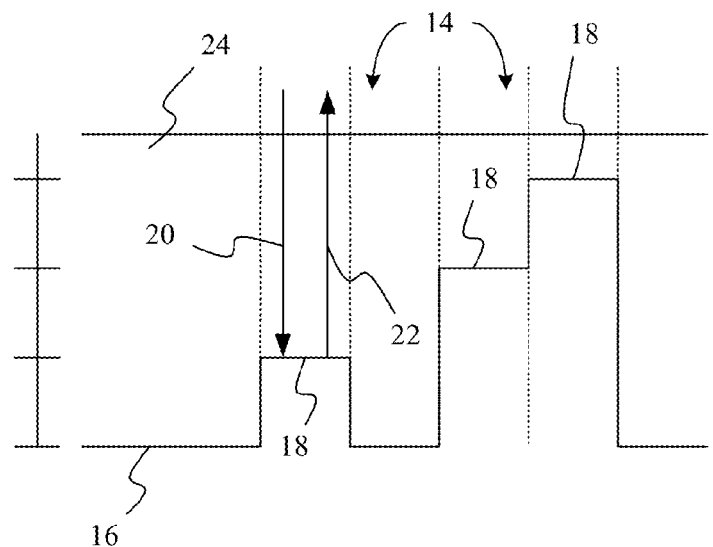
FIGS. 3A-3C are side views of examples of 3D codes according to embodiments.

FIG. 3A demonstrates that the surface 16 of the 3D code may be configured to include one or more protrusions 18 across the plurality of cells 14, wherein the protrusions 18 may vary in height from one cell location to the next. Accordingly, an outbound radar signal 20 from a computing device (not shown) may strike the protrusions 18, resulting in a reflected radar signal 22 that may be detected by the computing device and compared to the outbound radar signal 20 to determine the depth of each protrusion 18 on the surface 16. The depth information may also be used to determine, identify and/or verify the position of each cell 14 in a two dimensional (2D) plane substantially parallel to the surface 16. In this regard, the radar signals 20, 22 may also support sub-optimal read conditions (e.g., poor lighting, airborne debris, hand tremors/vibrations, scans that are at an angle relative to the 3D code, etc.).

In the illustrated example, the protrusions 18 have four possible heights, which results in two bits of information being encoded into the surface 16 at each cell 14. Other height variances may also be used to obtain different encoding capabilities from the protrusions 18 (e.g., four bits, sixteen bits, etc.). Additionally, the heights of the protrusions 18 may even be variable (e.g., mechanically or electrically controlled). The illustrated protrusions 18 might be formed on the surface 16 by, for example, 3D printing, stamping or other suitable techniques. Given the relatively small wavelength of radar signals and high resolution capabilities of radar technology, the protrusions 18 may be densely grouped, which may in turn enable substantial minimization of the 3D code.

As already noted, the protrusions 18 may optionally be covered by a material 24 (e.g., paint, epoxy, plastic, film) that is penetrable by the radar signals 20, 22, while being opaque and/or durable for security concerns. The material 24 may be applied to the surface 16 by various techniques (e.g., spraying, casting, etc.), depending upon the circumstances. In another example, the material 24 may be omitted and the protrusions 18 may be constructed in a manner that permits the protrusions 18 to wear down over time. Such an approach might be used to achieve a 3D code that is temporal in nature (e.g., limited time use), wherein the radar signals 20, 22 may enable the deterioration of the protrusions 18 to be detected.

Figure 3B:
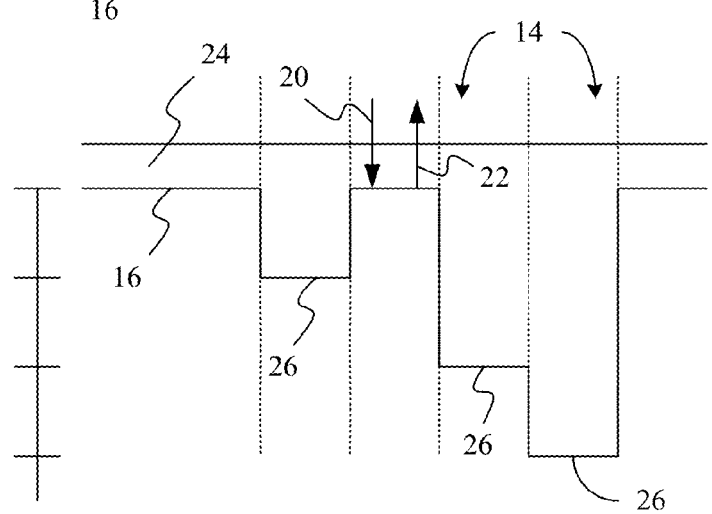

FIG. 3B demonstrates that the surface 16 of the 3D code may alternatively be configured to include one or more indentations 26 across the plurality of cells 14, wherein the indentations 26 may vary in height from one cell location to the next. Accordingly, the illustrated outbound radar signal 20 from the computing device (not shown) strikes the indentations 26, resulting in the reflected radar signal 22 that may be detected by the computing device and compared to the outbound radar signal 20 to determine the depth of each indentation 26 on the surface 16. The depth information may also be used to determine, identify and/or verify the position of each cell 14 in a 2D plane substantially parallel to the surface 16.

Figure 3C:
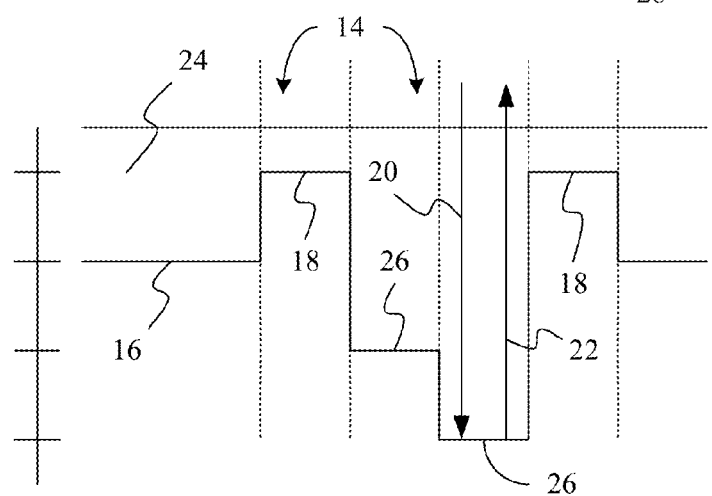

The indentations 26 may have, for example, four or more possible heights in order for the surface 16 to encode greater than one bit of information at each cell 14. Additionally, the heights of the indentations 26 may even be variable (e.g., mechanically or electrically controlled). Given the relatively small wavelength of radar signals and high resolution capabilities of radar technology, the indentations 26 may be densely grouped in order to minimize the 3D code. The illustrated indentations 26, which may optionally be covered by the material 24, are formed on the surface 16 by, for example, etching, engraving, etc. The illustrated approach of using the indentations 26 may reduce the amount of material 24 needed to cover the surface 16 and therefore reduce cost, weight, etc. FIG. 3C shows another example in which the surface 16 of the 3D code is configured to include both the protrusions 18 and the indentations 26.

Figure 4:
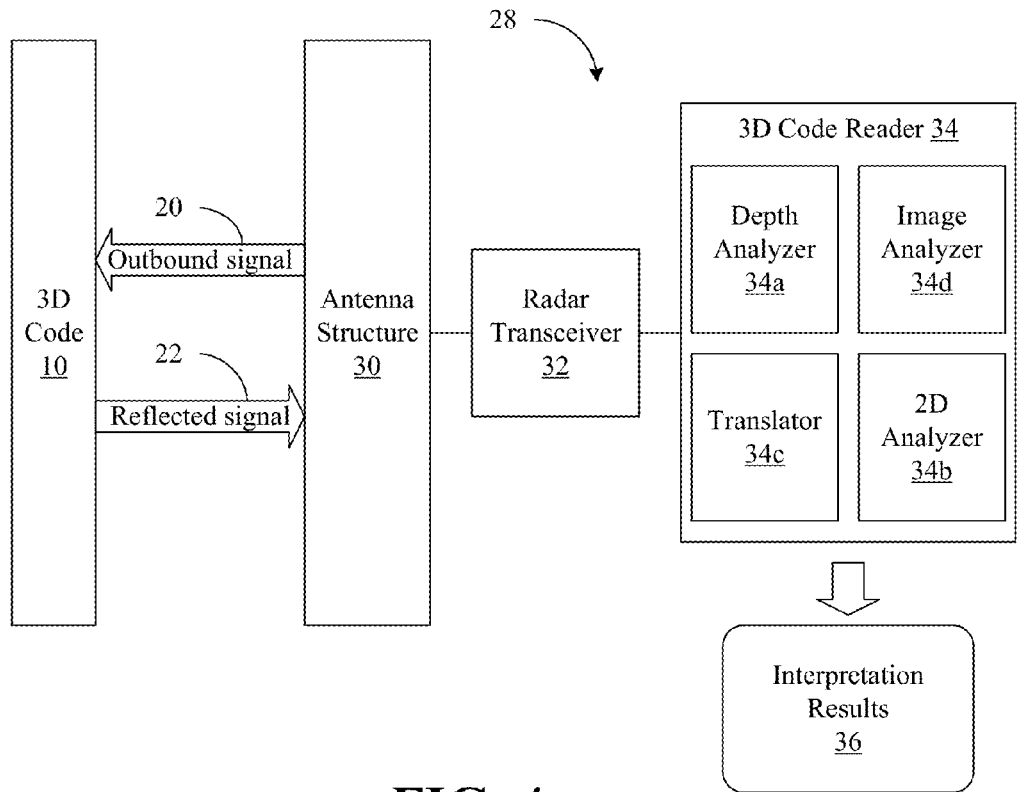
FIG. 4 is a block diagram of an example of a code interpretation architecture according to an embodiment.

Turning now to FIG. 4, a code interpretation architecture 28 is shown. The illustrated architecture 28 includes an antenna structure 30 such as, for example, a directional antenna (e.g., radiating energy in patterns of lobes or beams extending in a particular direction) and a radar transceiver 32 coupled to the antenna structure 30. The radar transceiver 32 may transmit the outbound radar signal 20 toward the 3D code 10 via the antenna structure 30 and receive the reflected radar signal 22 via the antenna structure 30. In one example, the radar transceiver 32 includes a micro impulse radar (MIR) transceiver that generates ultra wideband energy (e.g., >500 MHz) and operates at relatively low power.

The architecture 28 may also include a 3D code reader 34 (34a-34d) coupled to the radar transceiver 32. The 3D code reader 34 may generally interpret the 3D code 10 based on the outbound radar signal 20 and the reflected radar signal 22 and output interpretation results 36 based on the interpretation. More particularly, a depth analyzer 34a may determine depth data for each of a plurality of cells in the 3D code 10, wherein the depth data may encode greater than one bit of information for each of the plurality of cells in the 3D code 10. In one example, a 2D analyzer identifies the plurality of cells in the 3D code 10 based on the depth data. Additionally, a translator 34c may be coupled to the 2D analyzer 34b to generate a 2D image based on the plurality of cells and the depth data, wherein an image analyzer 34d may interpret the 2D image.

Figure 5:
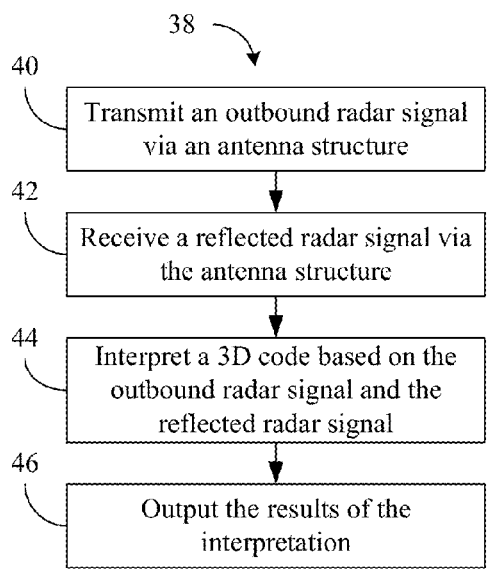
FIG. 5 is a flowchart of an example of a method of reading codes according to an embodiment.

Turning now to FIG. 5, a method 38 of reading codes is shown. The method 38 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 38 may be written in any combination of one or more programming languages, including an object oriented programming language such as Java, Smalltalk, C++ or the like and conventional procedural programming languages, such as the "C" programming language or similar programming languages.

Illustrated processing block 40 provides for transmitting an outbound radar signal via an antenna structure, wherein a reflected radar signal may be received via the antenna structure at block 42. As already noted, an MIR transceiver may transmit the outbound radar signal via a directional antenna and the reflected radar signal may be received via the directional antenna. Illustrated block 44 interprets a 3D code such as, for example, a 3D QR CODE, based on the outbound radar signal and the reflected radar signal. The results of the interpretation may be output at block 46.

Figure 6:
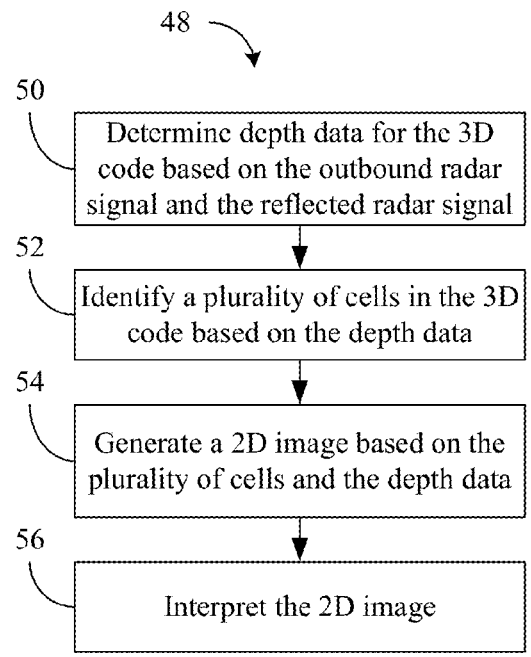
FIG. 6 is a flowchart of an example of a method of interpreting 3D codes based on radar signals according to an embodiment.

FIG. 6 shows a method 48 of interpreting 3D codes based on radar signals. The method 48 may therefore be readily substituted for block 44 (FIG. 5), already discussed. Illustrated block 50 determines depth information for a 3D code based on an outbound radar signal and a reflected radar signal. As already noted, the depth data may encode greater than one bit of information for each of the plurality of cells in the 3D code. A plurality of cells in the 3D code may be identified at block 52 based on the depth data, wherein illustrated block 54 provides for generating a 2D image based on the plurality of cells and the depth data. Additionally, the 2D image may be interpreted at block 56.

Figure 7:
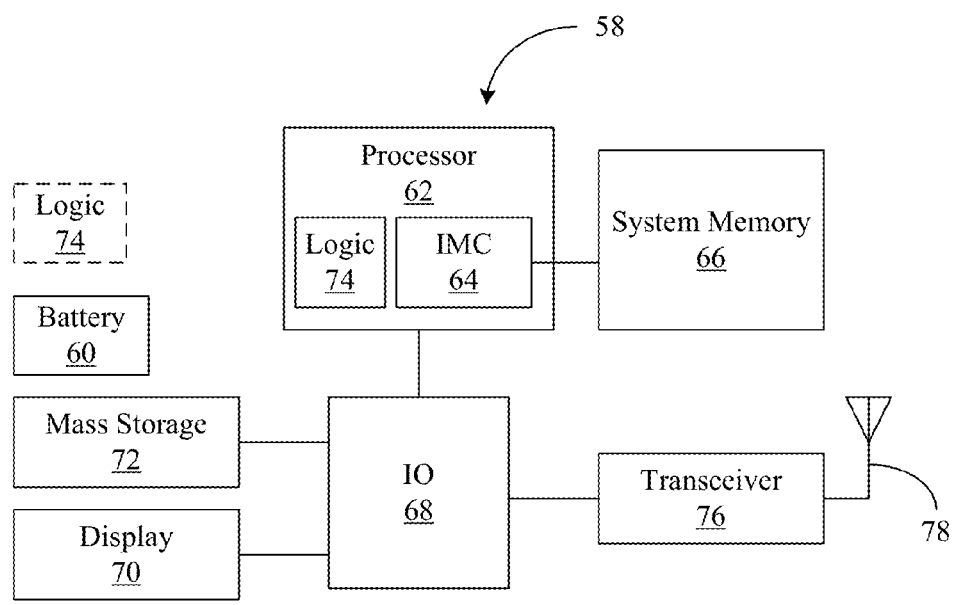
FIG. 7 is a block diagram of an example of a computing device according to an embodiment.

FIG. 7 shows a computing device 58. The computing device 58 may be part of a platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., mobile Internet device/MID). In the illustrated example, the device 58 includes a battery 60 to supply power to the device 58 and a processor 62 having an integrated memory controller (IMC) 64, which may communicate with system memory 66. The system memory 66 may include, for example, dynamic random access memory (DRAM) configured as one or more memory modules such as, for example, dual inline memory modules (DIMMs), small outline DIMMs (SODIMMs), etc.

The illustrated device 58 also includes a input output (10) module 68, sometimes referred to as a Southbridge of a chipset, that functions as a host device and may communicate with, for example, a display 70 (e.g., touch screen, liquid crystal display/LCD, light emitting diode/LED display), a radar transceiver 76/antenna structure 78, and mass storage 72 (e.g., hard disk drive/HDD, optical disk, flash memory, etc.). The illustrated processor 62 may execute logic 74 (e.g., logic instructions, configurable logic, fixed-functionality logic hardware, etc., or any combination thereof) configured to function similarly to the 3D code reader 34 (FIG. 4). Thus, the radar transceiver 76 may transmit outbound radar signals via the antenna structure 78 and receive reflected radar signals via the antenna structure 78, wherein the logic 74 may interpret 3D codes based on the outbound radar signals and the reflected radar signals. In one example, one or more of the 3D codes is a QR CODE having three dimensions and the logic 74 determines depth data for each of a plurality of cells in the QR CODE.

One or more aspects of the logic 74 may alternatively be implemented external to the processor 62. Additionally, the processor 62 and the JO module 68 may be implemented together on the same semiconductor die as a system on chip (SoC).

Additional Notes and Examples

Example 1 may include an apparatus to read three dimensional (3D) codes, comprising an antenna structure and a radar transceiver coupled to the antenna structure, the radar transceiver to transmit an outbound radar signal and receive a reflected radar signal via the antenna structure. The apparatus may also comprise a 3D code reader coupled to the radar transceiver, the 3D code reader to interpret a 3D code based on the outbound radar signal and the reflected radar signal.

Example 2 may include the apparatus of Example 1, wherein the 3D code reader includes a depth analyzer to determine depth data for each of a plurality of cells in the 3D code.

Example 3 may include the apparatus of Example 2, wherein the depth data is to encode greater than one bit of information for each of the plurality of cells in the 3D code.

Example 4 may include the apparatus of Example 2, wherein the 3D code reader further includes a two dimensional (2D) analyzer to identify the plurality of cells in the 3D code based on the depth data, a translator coupled to the 2D analyzer, the translator to generate a 2D image based on the plurality of cells and the depth data, and an image analyzer to interpret the 2D image.

Example 5 may include the apparatus of any one of Examples 1 to 4, wherein the antenna structure includes a directional antenna.

Example 6 may include the apparatus of any one of Examples 1 to 4, wherein the radar transceiver includes a micro impulse radar (MIR) transceiver.

Example 7 may include the apparatus of any one of Examples 1 to 4, wherein the 3D code is a QR CODE.

Example 8 may include a three dimensional (3D) code comprising a surface that is non-penetrable by a radar signal, the surface including a plurality of cells, wherein a depth of the surface varies across the plurality of cells. The 3D code may also include a material covering the plurality of cells, wherein the material is penetrable by the radar signal and visually masks the depth of the surface across the plurality of cells.

Example 9 may include the 3D code of Example 8, wherein the depth of the surface encodes greater than one bit of information for each of the plurality of cells.

Example 10 may include the 3D code of Example 8, wherein the surface includes one or more protrusions or indentations.

Example 11 may include the 3D code of any one of Examples 8 to 10, further including a QR CODE.

Example 12 may include a method of reading three dimensional (3D) codes, comprising transmitting an outbound radar signal via an antenna structure, receiving a reflected radar signal via the antenna structure, and interpreting a 3D code based on the outbound radar signal and the reflected radar signal.

Example 13 may include the method of Example 12, wherein interpreting the 3D code includes determining depth data for each of a plurality of cells in the 3D code.

Example 14 may include the method of Example 13, wherein the depth data encodes greater than one bit of information for each of the plurality of cells in the 3D code.

Example 15 may include the method of Example 13, wherein interpreting the 3D code further includes identifying the plurality of cells in the 3D code based on the depth data, generating a two dimensional (2D) image based on the plurality of cells and the depth data, and interpreting the 2D image.

Example 16 may include the method of any one of Examples 12 to 15, wherein the outbound radar signal is transmitted via a directional antenna and the reflected radar signal is received via the directional antenna.

Example 17 may include the method of any one of Examples 12 to 15, wherein a micro impulse radar (MIR) transceiver is used to transmit the outbound radar signal and receive the reflected radar signal.

Example 18 may include the method of any one of Examples 12 to 15, wherein the 3D code is a QR CODE.

Example 19 may include at least one computer readable storage medium comprising a set of instructions which, when executed by a computing device, cause the computing device to transmit an outbound radar signal via an antenna structure, receive a reflected radar signal via the antenna structure, and interpret a 3D code based on the outbound radar signal and the reflected radar signal.

Example 20 may include the at least one computer readable storage medium of Example 19, wherein the instructions, when executed, cause a computing device to determine depth data for each of a plurality of cells in the 3D code.

Example 21 may include the at least one computer readable storage medium of Example 20, wherein the depth data is to encode greater than one bit of information for each of the plurality of cells in the 3D code.

Example 22 may include the at least one computer readable storage medium of Example 20, wherein the instructions, when executed, cause a computing device to identify the plurality of cells in the 3D code based on the depth data, generate a two dimensional (2D) image based on the plurality of cells and the depth data, and interpret the 2D image.

Example 23 may include the at least one computer readable storage medium of any one of Examples 19 to 22, wherein the outbound radar signal is to be transmitted via a directional antenna and the reflected radar signal is to be received via the directional antenna.

Example 24 may include the at least one computer readable storage medium of any one of Examples 19 to 22, wherein a micro impulse radar (MIR) transceiver is to be used to transmit the outbound radar signal and receive the reflected radar signal.

Example 25 may include the at least one computer readable storage medium of any one of Examples 19 to 22, wherein the 3D code is to be a QR CODE.

Example 26 may include an apparatus to read codes, comprising means for performing the method of any of Examples 12 to 18.

Thus, techniques described herein may provide for the transmission of data from static physical objects to a computing device without the need or constraints of an optical camera to do so. Moreover, techniques may enable physical codes containing unique serial numbers to be etched directly onto sensitive silicon parts, making it difficult to remove the serial numbers without destroying the underlying electronics in the process. Such an approach may be particularly suitable for theft tracking of stolen systems, components, semiconductor chips, vehicles or other manufactured goods.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   an antenna structure;
   a radar transceiver coupled to the antenna structure, the radar transceiver to transmit an outbound radar signal and receive a reflected radar signal via the antenna structure; and
   a three dimensional (3D) code reader coupled to the radar transceiver, the 3D code reader to interpret a 3D code based on the outbound radar signal and the reflected radar signal.

2. The apparatus of claim 1, wherein the 3D code reader includes a depth analyzer to determine depth data for each of a plurality of cells in the 3D code.

3. The apparatus of claim 2, wherein the depth data is to encode greater than one bit of information for each of the plurality of cells in the 3D code.

4. The apparatus of claim 2, wherein the 3D code reader further includes:
   a two dimensional (2D) analyzer to identify the plurality of cells in the 3D code based on the depth data;
   a translator coupled to the 2D analyzer, the translator to generate a 2D image based on the plurality of cells and the depth data; and
   an image analyzer to interpret the 2D image.

5. The apparatus of claim 1, wherein the antenna structure includes a directional antenna.

6. The apparatus of claim 1, wherein the radar transceiver includes a micro impulse radar (MIR) transceiver.

7. The apparatus of claim 1, wherein the 3D code is a QR CODE.

8. A method comprising:
   transmitting an outbound radar signal via an antenna structure;
   receiving a reflected radar signal via the antenna structure; and
   interpreting a three dimensional (3D) code based on the outbound radar signal and the reflected radar signal.

9. The method of claim 8, wherein interpreting the 3D code includes determining depth data for each of a plurality of cells in the 3D code.

10. The method of claim 9, wherein the depth data encodes greater than one bit of information for each of the plurality of cells in the 3D code.

11. The method of claim 9, wherein interpreting the 3D code further includes:
    identifying the plurality of cells in the 3D code based on the depth data;
    generating a two dimensional (2D) image based on the plurality of cells and the depth data; and
    interpreting the 2D image.

12. The method of claim 8, wherein the outbound radar signal is transmitted via a directional antenna and the reflected radar signal is received via the directional antenna.

13. The method of claim 8, wherein a micro impulse radar (MIR) transceiver is used to transmit the outbound radar signal and receive the reflected radar signal.

14. The method of claim 8, wherein the 3D code is a QR CODE.

15. At least one computer readable storage medium comprising a set of instructions which, when executed by a computing device, cause the computing device to:
    transmit an outbound radar signal via an antenna structure;
    receive a reflected radar signal via the antenna structure; and
    interpret a three dimensional (3D) code based on the outbound radar signal and the reflected radar signal.

16. The at least one computer readable storage medium of claim 15, wherein the instructions, when executed, cause a computing device to determine depth data for each of a plurality of cells in the 3D code.

17. The at least one computer readable storage medium of claim 16, wherein the depth data is to encode greater than one bit of information for each of the plurality of cells in the 3D code.

18. The at least one computer readable storage medium of claim 16, wherein the instructions, when executed, cause a computing device to:
    identify the plurality of cells in the 3D code based on the depth data;
    generate a two dimensional (2D) image based on the plurality of cells and the depth data; and
    interpret the 2D image.

19. The at least one computer readable storage medium of claim 15, wherein the outbound radar signal is to be transmitted via a directional antenna and the reflected radar signal is to be received via the directional antenna.

20. The at least one computer readable storage medium of claim 15, wherein a micro impulse radar (MIR) transceiver is to be used to transmit the outbound radar signal and receive the reflected radar signal.

21. The at least one computer readable storage medium of claim 15, wherein the 3D code is to be a QR CODE.

* * * * *